Patented Mar. 9, 1937

2,072,902

UNITED STATES PATENT OFFICE 2,072,902

MANUFACTURE OF COMPOSITIONS OF MATTER CONTAINING SYNTHETIC RESINS

William Henry Moss, London, England, assignor to Celanese Corporation of America, a corporation of Delaware No Drawing. Original application November 10, 1934, Serial No. 752,473. Divided and this application March 19, 1936, Serial No. 69,663. In Great Britain November 22, 1933

9 Claims. (Cl. 134—26)

This invention relates to the manufacture of lacquers, moulding powders and other compositions of matter containing synthetic resins and to the production of films and other spun products, moulded articles and the like from such compositions of matter, and is a divisional application of my U. S. application S. No. 752,473 filed November 10, 1934.

Difficulties have been experienced in the past in the manufacture of lacquers and other coating compositions containing synthetic resins, e. g. lacquers containing phenol formaldehyde resins, in that such compositions and films formed therefrom have tended to darken on exposure to light. It has now been discovered that lacquers and like compositions which have a much reduced tendency to darken on exposure to light may be formed from synthetic resins obtainable by re-acting a phenol with a halogenated aliphatic ketone and then reacting the product with formaldehyde or a substance yielding formaldehyde.

Furthermore in the manufacture of moulded articles from compositions containing synthetic resins in which conversion of a fusible resin to an infusible form occurs, it is desirable that such conversion shall take place as rapidly as possible. It has been found that the synthetic resins referred to above are particularly rapidly converted into an insoluble, infusible form so that moulding compositions containing them are of considerable value.

The present invention, therefore, is concerned with lacquers, moulding powders and other compositions of matter which comprise resins obtainable by reacting a phenol with a halogenated aliphatic ketone and then reacting the product with formaldehyde or a substance yielding formaldehyde, and with the production of films and other spun products, moulded articles and the like therefrom.

The phenols employed in the manufacture of the synthetic resins employed according to the present invention are preferably monohydric phenols, e. g. xylenols and meta- and para-cresols, and poly-nuclear compounds which, though more than one phenolic group is present, do not contain more than one such group in each nucleus. Particularly valuable phenols are phenol itself, o-cresol, the mixture of cresols known as cresylic acid, and diphenylol propane. The best halogenated ketone to employ is chloracetone, though other halogenated ketones, e. g. monochlor methyl ethyl ketone may be employed. Instead of formaldehyde itself, substances yielding formaldehyde, e. g. hexamethylene tetramine may be used, and the term "formaldehyde" is used in the description and claims to include such substances.

The formation of the resin is preferably carried out in the presence of a suitable catalyst, e. g. hydrochloric acid, phosphoric acid, zinc chloride or other acid catalyst, or caustic soda or other alkaline catalyst. The resin may be obtained by reacting the phenol with the ketone and then reacting the product with formaldehyde, or, alternatively, instead of forming the resin direct from the phenol, ketone and aldehyde in a continuous process, the previously prepared product obtained from a phenol and a ketone may be reacted with formaldehyde to form a resin of the type to which the present invention relates. Thus condensation products obtained from a phenol and chloracetone are already known, and the resins employed according to the present invention may be obtained by reacting such products with formaldehyde. The proportions of constituents employed may be varied, but in general proportions of about two molecules of the phenol to one molecule of ketone and from one to three molecules of formaldehyde yield the best results. When an acid catalyst is to be employed in a reaction in which hexamethylene tetramine is present, due allowance should of course be made for the acid neutralized in decomposing the hexamethylene tetramine.

In general, the synthetic resins employed in the compositions of matter of this invention are fusible, soluble in solvents such as acetone, alcohol, acetic acid and dilute caustic soda, and are insoluble in benzene and similar hydrocarbons. The synthetic resins employed according to this invention may be rapidly converted into an infusible insoluble form and for this reason compositions comprising such resins are very valuable for the production of moulded products, e. g. gramophone records. The synthetic resins have a very good resistance to light, and films may be formed from compositions containing the above synthetic resins and cellulose acetate which show practically no darkening after an exposure of four days to the fadeometer, (whereas ordinary phenol-formaldehyde resins show considerable darkening under these conditions) which is of course a property of great value in lacquers. The synthetic resins referred to above when prepared in the presence of acid catalysts are, in general, compatible with cellulose acetate and other organic derivatives of cellulose. The resins are also compatible with other natural and synthetic resins, particularly with the synthetic resins obtained by the polymerization of vinyl acetate or other vinyl compounds, and the compositions of the present invention may contain, in addition to the synthetic resins, any of such substances or mixtures thereof. Compositions containing the above synthetic resins dissolved in organic solvents such as acetone may be formed into films and other products by wet or dry spinning processes. As stated above, the resins obtained from chloracetone, formaldehyde and phenol, o-cresol, cresylic acid or diphenylol propane are especially valuable.

The compositions of the present invention may contain suitable plasticizers, examples of which are tricresyl and triphenyl phosphates and other alkyl phosphates, di-ethyl and di-butyl tartrates and other esters, for example di- and tri-acetins. They may also contain colouring materials, e. g. boneblack, iron oxide and manganese dioxide, and fillers, for example China clay, micro asbestos, bentonite, wood flour, cotton flock, mica and gypsum.

The following examples are given in order to illustrate the invention, but it is to be understood that they do not limit it in any way:—

Example 1

The following is an example of one method of preparing a synthetic resin which may be employed in the compositions of matter of the present invention. 50 parts by weight of phenol-chloracetone resin are heated at 100° C. under reflux for about 5 minutes with 20-40 parts by weight of 40% formaldehyde solution in the presence of about .5 parts by weight of concentrated hydrochloric acid. The resin formed is washed with water and is similar in appearance to the phenol-chloracetone resin except that it has a lower melting point. When washed and dried it is fusible at about 100° C., while on cooling it shows a melting point of approximately 80° C., whereas the phenol-chloracetone resin employed as starting material solidifies at about 120° C. Moreover, while the phenol-chloracetone resin may be heated for a considerable time at temperatures up to 200° C. without being converted into an insoluble form, the phenol-chloracetone formaldehyde resin may be converted into such form by heating at temperatures of even of the order of 100° C. This property of course is of great importance in the manufacture of moulded products. The resin is soluble in acetone, acetic acid, and dilute caustic soda, and insoluble in benzole, and is compatible with cellulose acetate in all proportions giving hard films.

The process described in the above example may be modified by the use of about .25 parts by weight of phosphoric acid instead of the hydrochloric acid. In this case the reaction is considerably slower, taking from 2-4 hours, and in consequence may be better controlled. If, instead of phosphoric acid an alkaline catalyst is used, for example 2 parts by weight of 5% caustic soda solution, the resin obtained is incompatible with cellulose acetate.

Example 2

108 parts by weight of ortho-cresol are heated under reflux with 46 parts by weight of chloracetone in the presence of 10 parts by weight of concentrated hydrochloric acid. A vigorous reaction takes place which is controlled by cooling if necessary. The resinous condensation product obtained, which when purified melts at about 110° C., is then reacted with formaldehyde in a proportion of about 55 parts of resin to 20 to 40 parts of 40% formaldehyde. The reaction may be effected by similar methods to those described in the preceding Example, and a resin which has similar properties to that produced according to Example 1 is obtained.

The following are examples of compositions of matter according to the present invention:—

Example 3

A clear coating lacquer may be prepared from the following constitutents:—

| | Parts by weight |
|---|---|
| Cellulose acetate | 40 |
| Phenol-chloracetone formaldehyde resin | 60 |
| Diethyl phthalate | 20 |
| Tricresyl phosphate | 5 |
| Acetone | 200 |
| Benzene | 112 |
| Alcohol | 88 |
| Ethyl lactate | 40 |

Example 4

A pigmented lacquer may be obtained by incorporating 20 parts by weight of chrome green or 10 parts by weight of carbon black in the lacquer described in Example 3.

Example 5

A composition containing vinyl acetate and the synthetic resin may be obtained from the following constituents:—

| | Parts by weight |
|---|---|
| Polymerized vinyl acetate | 50 |
| Phenol-chloracetone formaldehyde resin | 50 |
| Acetone | 200 |
| Benzene | 112 |
| Alcohol | 88 |

Instead of vinyl acetate, ethyl cellulose, benzyl cellulose or cellulose nitrate may be employed.

Example 6

A plastic composition containing the resin may be obtained as follows:—

| | Parts by weight |
|---|---|
| Cellulose acetate | 100 |
| Phenol-chloracetone formaldehyde resin | 25 |
| Dibutyl tartrate | 30 |

The dibutyl tartrate and resin are incorporated in any suitable manner with the cellulose acetate, either with or without the use of solvents. The resulting mass may be ground to a fine powder, suitable for moulding.

The above composition may also contain a filler, e. g. china clay, micro asbestos or bentonite.

Example 7

A product containing a large amount of resin is prepared from the following constituents:—

| | Parts by weight |
|---|---|
| Phenol-chloracetone formaldehyde resin | 95 |
| Cellulose acetate | 14 |
| Triacetin | 45 |
| China clay | 120 |

Instead of the phenol-chloracetone formaldehyde resin the resin obtained from ortho-cresol according to Example 2 may be employed in corresponding proportions in Examples 3–7.

Having described my invention what I desire to secure by Letters Patent is:—

1. Compositions of matter containing an organic derivative of cellulose and a synthetic resin compatible therewith and obtainable by the reaction of formaldehyde with the condensation product of a phenol with a halogenated aliphatic ketone.

2. Compositions of matter containing cellulose acetate and a synthetic resin compatible therewith and obtainable by the reaction of formaldehyde with the condensation product of phenol itself with chloracetone.

3. Compositions of matter containing cellulose acetate and a synthetic resin compatible therewith and obtainable by the reaction of formaldehyde with the condensation product of orthocresol with chloracetone.

4. Compositions of matter containing cellulose acetate and a synthetic resin compatible therewith and obtainable by the reaction of formaldehyde with the condensation product of diphenylol propane with chloracetone.

5. Lacquers and other coating compositions containing an organic derivative of cellulose and a synthetic resin, compatible therewith and obtainable by the reaction of formaldehyde with the condensation product of a phenol with chloracetone, dissolved in a solvent medium.

6. Lacquers and other coating compositions containing cellulose acetate and a synthetic resin, compatible therewith and obtainable by the reaction of formaldehyde with the condensation product of a phenol with chloracetone, dissolved in a solvent medium.

7. Moulding compositions containing an organic derivative of cellulose and a synthetic resin compatible therewith and obtainable by the reaction of formaldehyde with the condensation product of a phenol with chloracetone.

8. Molding compositions containing cellulose acetate and a synthetic resin compatible therewith and obtainable by the reaction of formaldehyde with the condensation product of a phenol with chloracetone.

9. Gramophone records and other moulded products comprising an organic derivative of cellulose and a synthetic resin compatible therewith and obtainable by the reaction of formaldehyde with the condensation product of a phenol with a halogenated aliphatic ketone.

WILLIAM HENRY MOSS.